Patented Feb. 6, 1923.

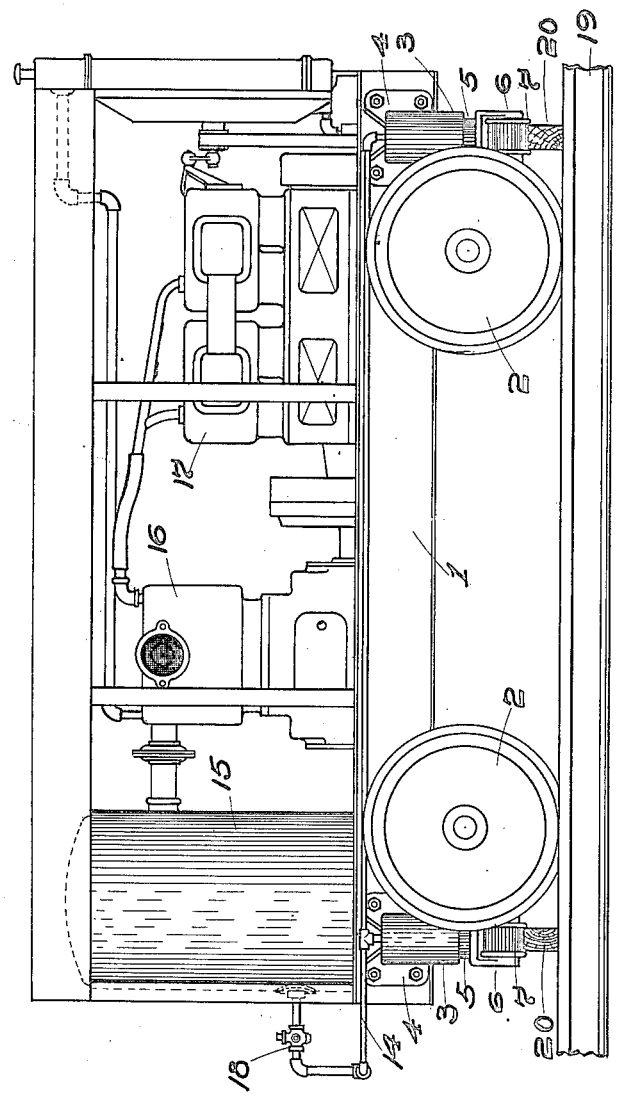

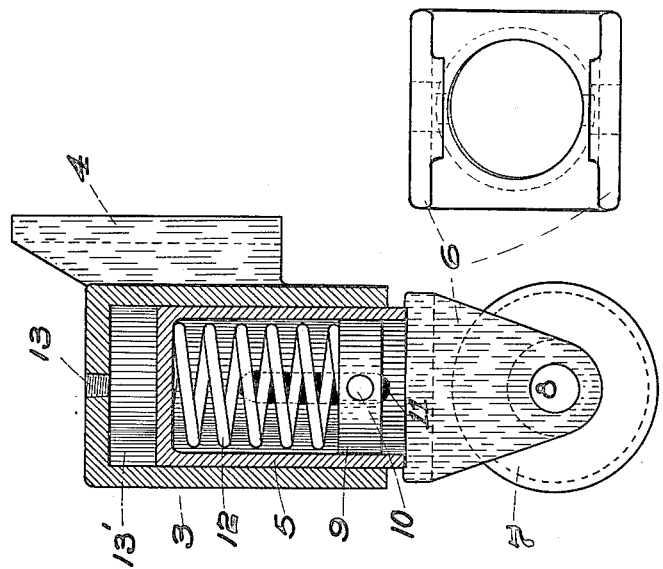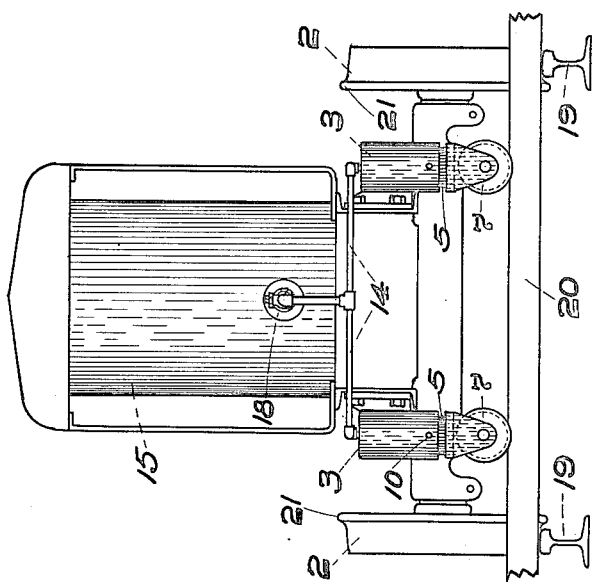

1,444,115

UNITED STATES PATENT OFFICE.

OSCAR C. ESTERGREEN, OF FRANKLIN, PENNSYLVANIA, ASSIGNOR TO CHICAGO PNEUMATIC TOOL COMPANY, OF NEW YORK, N. Y., A CORPORATION OF NEW JERSEY.

TRUCK.

Application filed September 18, 1922. Serial No. 588,988.

*To all whom it may concern:*

Be it known that I, OSCAR C. ESTERGREEN, citizen of the United States, residing at Franklin, in the county of Venango and State of Pennsylvania, have invented certain new and useful Improvements in Trucks, of which the following is a specification.

The object, construction and utility of my improved truck are herein set forth with sufficient clearness to enable others skilled in the arts to which its construction and use respectively relate, to make and use the same.
My invention relates especially to that class of trucks which are adapted for use upon railways, and are provided with flanged wheels common to this type of a truck. My invention is adapted for use with any type of truck for railway services, such as the general public railways, also those known as industrial railways, which are to be found in manufacturing establishments, in warehouses, upon docks, etc.
However, my invention is more especially designed for use in the construction and maintenance-of-way departments of general railways, for transporting construction and repair equipment, such as will later be described.

In the drawings which form a part hereof, I have shown my improved truck as arranged and adapted for carrying a portable air compressor plant, for supplying compressed air for the operation of various pneumatic tools such as those for tamping ballast around railway ties, for boring holes for the insertion of screw spikes, for driving screw-spikes and common railway spikes and for many other uses and purposes in the construction and maintenance of railway tracks.

In the repair of railway tracks, it is often necessary to make repairs to tracks that are carrying regular train service, and in such cases repairs must be made without interfering with such train service. Because of this requirement, it is necessary that any repair tools or equipment should be easily and quickly removable from, and as easily and quickly replaceable upon the track.

In the drawings:

Fig. 1 is a side elevation of a truck equipped in accordance with my invention.

Fig. 2 is an end elevation of said truck.

Fig. 3 is an elevation partly in section of the transposing wheel organization.

Fig. 4 is an inverted plan view of the piston which carries a transposing wheel.

The construction illustrated in said drawings is substantially as follows:

The frame 1 of a truck,—which may be of any suitable construction, is provided with the usual primary flanged mobility wheels 2, whereby it is adapted to travel upon a railway track.

For the purpose of providing means for the quick and easy lateral removal of such a truck from the track upon which it is being used, or for the purpose of transposing or removing same in a direction transversely to the track upon which it is being employed, to an adjacent parallel track, I equip said truck 1 with what I have termed "secondary mobility" or "transposing wheels," which equipment consists of a plurality of wheel organizations such as that shown in Fig. 3.

The application, construction and operation of said secondary mobility or transposing wheel equipment is as follows:

Upon both sides of said truck frame, adjacent each end thereof, I mount a unit—Fig. 3—of said transverse wheel equipment, which unit comprises a cylinder 3, having suitable wings or brackets 4 whereby it is attached to said frame 1. Said cylinder is closed at its upper end and is open at its lower end, and its axis is disposed vertically. Within said cylinder 3 is inserted a piston 5 of the trunk type, which is bifurcate at its lower end—see Fig. 4—and between the forks, or wheel-carrying members 6, of said piston, the transposing wheel 7 is mounted by means of a pin or axle 8. Within said piston 5 is rigidly mounted a spring-support 9 which is held in position by a pin 10 that passes through said support 9 and the walls of said cylinder 3. A slot 11 is formed in the walls of said piston for the accommodation of said pin 10 so that said piston may have vertical movement, without interference with said pin. Said pin and slot also serve to prevent said piston, and the wheels carried thereby, from swiveling.

Within said piston 5 is placed a compression spring 12, one end of which bears upon said support 9, and the other end thereof upon the upper wall of said piston. The office of said spring is, to keep said piston 5 and the wheel carried thereby in their raised, uppermost position. A pipe tap 13 is provided in the top wall of said cylinder 3, into which a pipe 14 is inserted for supplying compressed air to the actuation chamber 13' of said cylinder. Said pipe 14 communicates with the receiver 15, into which an air compressor 16 discharges its compressed air product; said air compressor is operated by a motor 17. Said pipe 14 has communication with said receiver through a three-way valve 18, whereby compressed air may be admitted to and released from said actuation chamber 13' of the respective cylinders 3. The compressed air plant, consisting of said motor, air compressor, and said receiver, are mounted upon and carried by said truck, which travels normally upon said wheels 2, and preferably, but not necessarily, upon a railway track 19.

When it becomes necessary to remove said plant from the track upon which it is located, any suitable form of rail 20, which extend transversely of said rail 19 are placed beneath the transposing wheels 7; compressed air is then admitted to the actuation chamber of each of the cylinders 3, by means of the three-way valve 18, and after said wheels 7 have become firmly seated upon said rails 20, said plant is caused to rise until said wheels 2 are free, and the plant is thus carried by said transposing wheels 7 and may be moved laterally, that is, in a line transversely to the normal travel of the plant. Usually the plant is thus laterally moved and deposited upon an adjacent parallel track, but if no such track is present, it may be deposited upon any other suitable support, so that the transverse rails 20 may be removed.

It will be readily noted that each transverse wheel organization—Fig. 3—constitutes a lifting jack for said truck; that said jacks are carried by said truck; that each of said jacks is provided with a base-wheel; that when supported upon said jacks said base wheels constitute the mobility wheels for said truck and that by means of said jack construction the wheels carried thereby are readily constituted for the primary wheels of the truck.

I claim the following:

1. The combination with a truck having primary mobility wheels whereon it normally travels in a determined direction, of a plurality of secondary mobility wheel structures having wheels arranged to be substitutive for said primary mobility wheels the axes of which are disposed at an angle to the axes of said primary mobility wheels, said wheel structures each comprising in combination; a vertically-disposed cylinder closed at its upper end, open at its lower end, secured to said truck and arranged for the admission of actuative fluid into the upper end thereof, a piston in said cylinder having downwardly-extending wheel-carrying members arranged to extend below the lower end of said cylinder, secondary mobility wheels carried by said wheel-carrying members, a compression spring carried within said piston and adapted to actuate same to the upper limit of its travel, a source of actuative fluid for said piston, and means admitting actuative fluid to all of said cylinders simultaneously to actuate their respective pistons to the lower limit of travel whereby said secondary mobility wheels are caused to raise, sustain, carry, and adapt said truck to travel upon said secondary mobility wheels, instead of upon said primary mobility wheels.

2. The combination with a truck having primary mobility wheels whereon it normally travels in a determined direction, of a plurality of secondary mobility wheel-structures having wheels arranged to be substitutive for said primary mobility wheels and the axes of which are disposed at an angle to the axes of said primary mobility wheels, said wheel structures each comprising in combination; a vertically-disposed cylinder closed at its upper end, open at its lower end, secured to the side of said truck and arranged for the admission of actuative fluid to the upper end thereof, a piston in said cylinder having downwardly-extending wheel-carrying members arranged to extend below the lower end of said cylinder, secondary mobility wheels carried by said wheel-carrying members, a compression spring carried within said piston adapted to actuate same to the upper limit of its travel, a source of actuative fluid for said piston, and means admitting actuative fluid to all of said cylinders simultaneously to actuate their respective pistons to the lower limit of their travel whereby said secondary mobility wheel-structures are caused to raise, sustain, carry and adapt said truck to travel upon said secondary mobility wheels, instead of upon said primary mobility wheels.

3. The combination with a truck having primary mobility wheels whereon it normally travels in a determined direction, of a plurality of secondary mobility wheel-structures having wheels arranged to be substitutive for said primary mobility wheel and the axes of which are disposed at an angle to the axes of said primary mobility wheels, said wheel-structures each comprising in combination; a vertically-disposed cylinder closed at its upper end, open at its lower end, secured to the side of said truck below the upper surface thereof and arranged for the admission of actuative air into its upper end, a piston in said cylinder having downwardly-extending wheel-carrying members arranged to extend below the lower end of said cylinder, a secondary mobility wheel carried by said wheel-carrying members, a compression spring carried within said piston and adapted to actuate same to the upper limit of its travel, a source of actuative fluid for said piston, and means admitting actuative fluid from said source to all of said cylinders simultaneously to actuate their respective pistons to the lower limit of their travel whereby said secondary mobility wheel-structures are caused to raise, sustain, carry and adapt said truck to travel upon said secondary mobility wheels, instead of upon said primary mobility wheels.

4. The combination with a truck having primary mobility wheels whereon it normally travels in a determined direction, of a plurality of secondary mobility wheel-structures having wheels arranged to be substitutive for said primary mobility wheels the axes of which are disposed at an angle to the axes of said primary mobility wheels, said structures each comprising in combination; a vertically-disposed cylinder closed at its upper end, open at its lower end, secured to said truck and arranged for the admission of actuative fluid into the upper end thereof, a piston of the trunk type in said cylinder having its lower end formed into wheel-carrying members arranged to extend below the lower end of said cylinder secondary mobility wheels carried by said wheel-carrying members, a compression spring carried within said piston adapted to actuate same to the upper limit of its travel, a source of actuative air for said piston, and means admitting actuative air from said source to all of said cylinders simultaneously to actuate their respective pistons to the lower limit of their travel whereby said secondary mobility wheel-structures are caused to raise, sustain, carry and adapt said truck to travel upon said secondary mobility wheels instead of upon said primary mobility wheels.

5. The combination with a truck having primary mobility wheels whereon it normally travels in a determined direction, of a plurality of secondary mobility wheel-structures having wheels arranged to be substitutive for said primary mobility wheels the axes of which are disposed at an angle to the axes of said primary mobility wheels, said structures each comprising in combination; a vertically-disposed cylinder closed at its upper end, open at its lower end and secured to the side of said truck, a piston of the trunk type in said cylinder having its lower end formed into wheel-carrying-members arranged to extend below the lower end of said cylinder, a secondary mobility wheel carried by said wheel-carrying members, a compression spring carried within said piston and adapted to actuate same to the upper limit of its travel, a source of actuative fluid for said piston, and means admitting actuative fluid from said source to all of said cylinders simultaneously to actuate their respective pistons to the lower limit of their travel whereby said secondary mobility wheel-structures are caused to raise, sustain, carry, and adapt said truck to travel upon said secondary wheels instead of upon said primary mobility wheels.

6. The combination with a truck having primary mobility wheels whereon it travels normally in a determined direction, of a plurality of secondary mobility wheel-structures having wheels arranged to be substitutive for said primary mobility wheels the axes of which are disposed at an angle to the axes of said primary mobility wheels, said wheel-structures each comprising in combination; a vertically-disposed cylinder closed at its upper end, open at its lower end, secured to the side of said truck below the upper surface thereof and arranged for the admission of actuative air into the upper end thereof, a piston of the trunk type in said cylinder having its lower end formed into wheel-carrying members arranged to extend below the lower end of said cylinder, a compression spring carried within said piston adapted to actuate same to the upper limit of its travel, a source of actuative air for said piston, and means admitting actuative air from said source to all of said cylinders simultaneously to actuate their respective pistons to the lower limit of their travel whereby said secondary mobility wheel-structures are caused to raise, sustain, carry, and adapt said truck to travel upon said secondary wheels instead of upon said primary mobility wheels.

7. The combination with a truck having primary mobility wheels whereon it normally travels in a determined direction, of a plurality of secondary mobility wheel-structures having wheels arranged to be substitutive for said primary mobility wheels the axes of which are disposed at an angle to the axes of said primary mobility wheels, said wheel-structures each comprising in combination; a vertically-disposed cylinder closed at its upper end, open at its lower end, secured to said truck and arranged for the admission of actuative air into the upper end thereof, a piston of the trunk type in said cylinder having its open end disposed downwardly and wheel-carrying members formed integrally with the walls thereof for the carrying of secondary mobility wheels, a secondary mobility wheel carried by said wheel-carrying members, a compression spring carried within said piston adapted to actuate same to the upper limit of its travel, a source of actuative fluid for said piston, and means admitting actuative fluid from said source into all of said cylinders simultaneously to actuate their respective pistons to the lower limit of their travel whereby said secondary mobility wheel-structures are caused to raise, sustain, carry, and adapt said truck to travel upon said secondary mobility wheels instead of upon said primary mobility wheels.

8. The combination with a truck having primary mobility wheels whereon it normally travels in a determined direction, of a plurality of secondary mobility wheel-structures having wheels arranged to be subtitutive for said primary mobility wheels the axes of which are disposed at an angle to the axes of said primary mobility wheels, said wheel-structures each comprising in combination; a vertically-disposed cylinder closed at its upper end, open at its lower end, secured to the side of said truck, and arranged for the admission of actuative air into the upper end thereof, a piston of the trunk type in said cylinder having its open end disposed downwardly and wheel-carrying members formed integrally with the walls thereof for the carrying of secondary mobility wheels, secondary mobility wheels carried by said wheel-carrying members, a compression spring carried within said piston adapted to actuate same to the upper limit of its travel, a source of actuative fluid for said piston, and means admitting actuating fluid from said source to all of said cylinders simultaneously to actuate their respective pistons to the lower limit of their travel whereby said secondary mobility wheel-structures are caused to raise, support, carry and to adapt said truck to travel upon said secondary mobility wheels, instead of upon said primary mobility wheels.

9 The combination with a truck having primary mobility wheels whereon it normally travels in a determined direction, of a plurality of secondary mobility wheel-structures having wheels arranged to be substitute for said primary mobility wheels the axes of which are disposed at an angle to the axes of said primary mobility wheels, said wheel-structures each comprising in combination; a vertically-disposed cylinder closed at its upper end, open at its lower end, secured to the side of said truck below the upper surface thereof, and arranged for the admission of actuative fluid to its upper end, a piston of the trunk type in said cylinder having its open end disposed downwardly and wheel carrying members formed integrally with the walls thereof for the carrying of secondary mobility wheels, secondary mobility wheels carried by said wheel-carrying members, a compression spring carried within said piston adapted to actuate same to the upper limit of its travel, a source of actuative fluid for said piston, and means admitted actuative fluid from said source into all of said cylinders simultaneously to actuate their respective pistons to the lower limit of their travel, whereby said secondary mobility wheel structures are caused to raise, support, and adapt said truck to travel upon said secondary mobility wheels, instead of upon said primary mobility wheels.

10. The combination with a truck having primary mobility wheels whereon it normally travels in a determined direction, of a plurality of secondary mobility wheel structures having wheels arranged to be substitutive for said primary mobility wheels, the axes of which are disposed at an angle to the axes of said primary mobility wheels, said wheel structures each comprising in combination; a vertically-disposed cylinder closed at its upper end, open at its lower end, secured to said truck, and arranged for the admission of actuative fluid into its upper end, a piston of the trunk type in said cylinder its side walls having as features thereof vertically-extending slots through the same also two downwardly-extending wheel-carrying members formed integrally with its walls, a secondary mobility wheel carried by said wheel-carrying members with its axis disposed at a right angle to the axis of said primary mobility wheels, a compression spring carried within said piston and adapted to actuate same to the upper limit of its travel, a pin extending diametrically across the bore of said cylinder through the slots of said piston with its ends fixed in the walls of said cylinder, a source of actuative fluid for said piston, and means admitting actuative fluid from said source into each of said cylinders to actuate their respective pistons to the lower limit of their travel, whereby said secondary mobility-wheel-structures are caused to raise, support carry and to adapt said truck to travel upon said secondary wheels instead of upon said primary mobility wheels.

11. The combination with a truck having primary mobility wheels whereon it travels normally in a determined direction, of a plurality of secondary mobility wheel-structures having wheels arranged to be substitutive for said primary mobility wheels, the axes of which are disposed at an angle to the axes of said primary mobility wheels, said structures each comprising in combination, a vertically-disposed cylinder closed at its upper end, open at its lower end, secured to the side of said truck, and arranged for the admission of actuative air into its upper end, a piston of the trunk type in said cylinder its side walls having as features thereof vertically-extending slots through the same also two downwardly-extending wheel-carrying members formed integrally with said side walls, a secondary mobility wheel carried by said wheel-carrying members with its axis disposed at a right angle to the axis of said primary mobility wheels, a compression spring carried within said piston adapted to actuate same to the upper limit of its travel, a pin extending diametrically across the bore of said cylinder through said slots of said piston with its ends fixed in the walls of said cylinder, a source of actuative air for said piston, and means admitting actuative fluid from said source into each of said cylinders to actuate their respective pistons to the lower limit of their travel, for the purpose set forth.

12. The combination with a truck having primary mobility wheels whereon it normally travels in a determined direction, of a plurality of secondary mobility wheel-structures having wheels arranged to be substitutive for said primary mobility wheels the axes of which are disposed at an angle to the axes of said primary mobility wheels, said wheel structures each comprising in combination, a vertically-disposed cylinder closed at its upper end, open at its lower end, secured to the side of said truck below the upper surface thereof and arranged for the admission of actuative air into its upper end, a piston of the trunk type in said cylinder its side walls having as features thereof vertically-extending slots through the same also two downwardly-extending wheel-carrying members formed integrally with said walls, secondary mobility wheels carried by said wheel-carrying members, a pin extending diametrically across the bore of said cylinder with its ends fixed in the walls thereof, said pin also extending through said slots in said piston, a compression spring carried within said piston and adapted to actuate same to the upper limit of its travel, a supply of actuative air for said piston carried by said truck, and means admitting actuative fluid from said source to all of said cylinders simultaneously to actuate their respective pistons to the lower limit of their travel whereby said secondary mobility wheel-structures are caused to raise, support, carry, and adapt said truck to travel upon said secondary mobility wheels instead of upon said primary mobility wheels.

13. The combination with a truck having primary mobility wheels whereon it normally travels in a determined direction, of a plurality of secondary mobility wheel-structures having wheels arranged to be substitutive for said primary mobility wheels the axes of which are disposed at an angle to the axes of said primary mobility wheels; said wheel structures each comprising in combination, a vertically-disposed cylinder closed at its upper end, open at its lower end, secured to the side of said truck and arranged for the admission of actuative air into its upper end, a piston of the trunk type in said cylinder its side walls having as features thereof vertically-extending slots through the same also two downwardly-extending wheel-carrying members formed integrally with said walls, a secondary mobility wheel carried by said wheel-carrying members with its axis disposed at a right angle to the axes of said primary mobility wheels, a pin extending diametrically across the bore of said cylinder with its ends fixed in the bore thereof, a spring-support carried by said pin, a compression spring within said piston supported at its lower end upon said spring support with its upper end bearing upon the under side of the upper wall of said piston, whereby said piston is actuated to the upper limit of its travel, a source of actuative air for said piston carried by said truck and means admitting actuative fluid from said source into each of said cylinders to actuate their respective pistons to the lower limit of their travel whereby the secondary mobility wheel-structures are caused to raise, support, carry and adapt said truck to travel upon said secondary mobility wheel instead of upon said primary mobility wheels.

14. The combination with a truck having primary mobility wheels whereon it normally travels in a determined direction, of a plurality of secondary mobility wheel-structures having wheels arranged to be substitutive for said primary mobility wheels the axes of which are disposed at an angle to the axes of said primary mobility wheels, said wheel-structures comprising in combination; a vertically-disposed cylinder closed at its upper end, open at its lower end, secured to said truck and arranged for the admission of an actuative fluid into the upper end thereof; a piston of the trunk type in said cylinder the side walls of which have as features thereof vertically-extending slots through the same also two downwardly-extending wheel-carrying members formed integrally with said walls, a secondary mobility wheel carried by said wheel-carrying members with its axis disposed at a right angle to the axis of said primary mobility wheels, a pin extending diametrically across the bore of said cylinder through the slots of said piston with its end fixed in the walls of said cylinder, a spring-support carried by said pin, a compression spring carried within said piston supported at its lower end upon said spring support, its upper end bearing upon the under side of the upper wall of said piston whereby said piston is actuated to and yieldably retained at the upper limit of its travel, a supply of actuative fluid for said piston carried by said truck, and means admitting actuative fluid from said source into each of said cylinders, to actuate their respective pistons to the lower limit of their travel whereby said secondary mobility wheel-structures are caused to raise, support, carry and adapt said truck to travel upon said secondary mobility wheels instead of upon said primary mobility wheels.

15. The combination with a truck having primary mobility wheels whereon it normally travels in a determined direction, of a plurality of secondary mobility wheel-structures having wheels arranged to be substitutive for said primary mobility wheels the axes of which are disposed at an angle to the axes of said primary mobility wheels, said wheel structures each comprising in combination; a vertically-disposed cylinder closed at its upper end, open at its lower end, secured to said truck and arranged for the admission of actuative fluid into the upper end thereof, a piston of the trunk type in said cylinder the side walls have as features thereof vertically extending slots through the same also two downwardly-extending wheel-carrying members formed integrally with its walls, a secondary mobility wheel carried by said wheel-carrying members with its axis disposed at a right angle to the axis of said primary mobility wheels, a pin extending diametrically across the bore of said cylinder through said slots in said piston with its ends fixed in the walls of said cylinder, a spring support carried by said pin, a compression spring within said piston supported at its lower end upon said spring support with its upper end bearing upon the under face of the upper wall of said piston whereby said piston is actuated to and normally retained at the upper limit of its travel, a supply of actuative fluid for said piston carried by said truck, and means admitting actuating fluid to all of said cylinders simultaneously to actuate their respective pistons to the lower limit of their travel whereby said secondary wheel structures are caused to raise, support, carry, and adapt said truck to travel upon said secondary mobility wheels, instead of upon its primary mobility wheels.

16. The combination with a truck having primary mobility wheels whereon it normally travels in a determined direction, of a plurality of secondary mobility wheel-structures having wheels arranged to be substitutive for said primary mobility wheels, the axes of which are disposed at an angle to the axes of said primary mobility wheels, said wheel-structures each comprising in combination, a vertically disposed cylinder closed at its upper end, open at its lower end and secured to the side of said truck below the upper surface thereof, a piston of the trunk type in said cylinder its side walls having as features thereof vertically-extending slots through the same also two downwardly-extending wheel-carrying members formed integrally with said walls, a secondary mobility wheel carried by said wheel-carrying members with its axis disposed at a right angle to the axes of said primary mobility wheels, a pin extending diametrically across the bore of said cylinder through the slots of said piston with its ends fixed in the walls of said cylinder, a spring support positioned within said piston carried by said pin, a compression spring within said piston supported at its lower end upon said spring support with its upper end bearing upon the under face of the upper wall of said piston whereby said piston is actuated to and yieldably retained in the upper limit of its travel, a source of actuative fluid for said piston and means admitting actuating fluid from said source into each of said cylinders to actuate their respective pistons to the lower limit of their travel whereby said secondary mobility wheel-structures are caused to raise, support and adapt said truck to travel upon said secondary mobility wheels instead of upon said primary mobility wheels.

17. The combination with a truck having primary mobility wheels whereon it normally travels in a determined direction, of a plurality of secondary mobility wheel-structures having wheels arranged to be substitutive for said primary mobility wheels the axes of which are disposed at an angle to the axes of said primary mobility wheels, said wheel-structures each comprising in combination; a vertically-disposed cylinder closed at its upper end, open at its lower end, secured to the side of said truck below the upper surface thereof, arranged for the admission of an actuative fluid into its upper end, a piston of the trunk type within said cylinder its side walls having as features thereof vertically-extending slots through the same also two downwardly-extending wheel-carrying members formed integrally with said walls, a secondary mobility wheel carried by said wheel-carrying members with its axis disposed at a right angle to the axes of said primary mobility wheels, a pin extending diametrically across the bore of said cylinder through the slots of said piston with its ends fixed in the walls of said cylinder a spring-support positioned within said piston carried by said pin, a compression spring within said piston supported at its lower end upon said spring-support with its upper end bearing upon the under face of the upper wall of said piston, whereby said piston is actuated to and yieldably retained in the upper limit of its travel and means admitting actuative fluid from said source into all of said cylinders simultaneously to actuate their respective pistons to the lower limit of their travel whereby the secondary mobility wheel-structures are caused to raise, support, carry and adapt said truck to travel upon said secondary mobility wheels instead of upon said primary mobility wheels.

In testimony whereof I affix my signature in presence of two witnesses.

OSCAR C. ESTERGREEN.

Witnesses:
 LEON F. HOFFMAN,
 R. P. COWIN.